3,663,579
DIMERIC STEROID-21-ALKYL-CARBONATES AND
PROCESS FOR THEIR MANUFACTURE
Ulrich Stache and Werner Haede, Hofheim, Taunus,
Werner Fritsch, Neuenhain, Taunus, Kurt Radscheit,
Kelkheim, Taunus, and Hans-George Schroder, Hofheim, Taunus, Germany, assignors to Farbwerke
Hoechst Aktiengesellschaft vormals Meister Lucius &
Bruning, Frankfurt am Main, Germany
No Drawing. Filed Apr. 24, 1969, Ser. No. 819,092
Claims priority, application Germany, May 3, 1968,
P 17 68 345.3
Int. Cl. C07c 169/32
U.S. Cl. 260—397.45                 10 Claims

ABSTRACT OF THE DISCLOSURE

Bis[steroid - 21] - alkyl carbonates having anti-inflammatory activity are prepared by reacting corticosteroids with bis-chloroformiates.

The present invention relates to new bis-[steroid-21]-alkyl-carbonates of the general formula

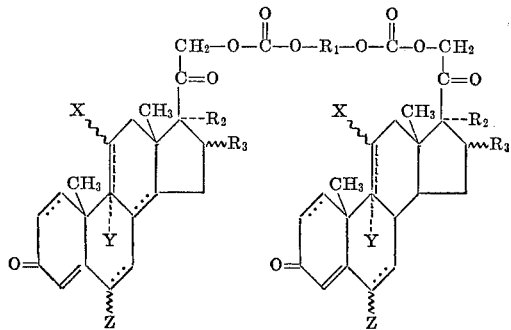

in which X represents 1 or 2 hydrogen atoms or the groupings

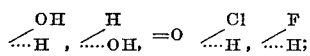

Y represents a hydrogen atom or a fluorine atom; Z represents a hydrogen or fluorine atom or a methyl group; $R_1$ represents an open-chain or cyclic alkylene radical which may be branched and/or interrupted by oxygen atoms, or an aralkylene or arylene radical; $R_2$ represents a hydrogen atom or the hydroxy group; and $R_3$ represents a hydrogen atom, a methyl group in α- or β- position, a fluorine atom or a methylene group which may be substituted by one or two fluorine atoms; and double bonds or oxido groups may also be present in 1,2-, 6,7- or 9,11- position.

The present invention, furthermore, relates to a process for the manufacture of compounds of the general Formula I, which comprises reacting corticosteroids of the general Formula II

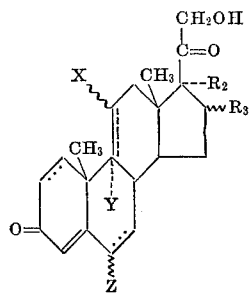

in which X, Y, Z, $R_2$ and $R_3$ are defined as above, and X may also represent a keto group, with a bis-chloroformiate of the general Formula III

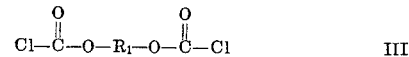

in which $R_1$ is defined as above, and if desired, subsequently introducing one or several fluorine atoms or a double bond in 1,2- and/or 6,7-position and/or reducing a 11-keto-group.

The corticosteroids used as starting substances are generally known. As such there may be mentioned:

cortisone,
hydrocortisone,
Reichstein's substance S,
prednisone,
predisolone,
6α-methylprednisolone,
16α- or 16β-methylprednisolone,
9α-fluoro- or 9α-chloro-prednisolone,
16-methylene-prednisolone,
6α,9α-difluoro-prednisolone,
6α-methyl-9α-fluoro-prednisolone,
6α-fluoro-prednisolone,
9α-fluoro-16α-methyl-prednisolone,
9α-fluoro-prednisolone,
9α-fluoro-16-methyl-prednisolone,
6α-fluoro-16α-methyl-prednisolone,
6α-fluoro-16β-methyl-prednisolone,
6α-fluoro-16-methylene-prednisolone,
6α,9α-difluoro-16α-methyl-prednisolone,
6α,9α-difluoro-16β-methyl-prednisolone,
6α,9α-difluoro-16-methylene-prednisolone,
9α-fluoro-6α,16α-dimethyl-prednisolone,
9α,16α-difluoro-prednisolone,
6α,9α,16α-trifluoro-prednisolone,
17α,21-dihydroxy-Δ$^{4(5),9(11)}$-pregnadiene-dione-(3,20),
17α,21-dihydroxy-9β,11β-oxido-Δ$^4$-pregnene-dione-(3,20),
17α,21-dihydroxy-9α,11β-dichloro-Δ$^{1,4}$-pregnadiene-dione-(3,20),
17α,21-dihydroxy-Δ$^{4(5),6(7)}$-pregnadiene-dione-(3,20),
desoxycorticosterone,
corticosterone,
16α-methyl-corticosterone,
9α-fluoro-16α-methyl-corticosterone,
6α,9α-difluoro-16α-methyl-corticosterone,
6α-fluoro-16α-methyl-corticosterone.

As bisfunctional alkyl- or aralkyl- or arylcholroformic acid esters (-chloroformiates), there may be mentioned, for example: Alkyl-bischloroformiates of the formula $$Cl\overset{O}{\overset{\|}{C}}O-(CH_2)_nO\overset{O}{\overset{\|}{C}}Cl$$

in which n is an integer of from 2 to 18.

Di-, tri-, tetra-, penta-, hexa-, hepta-, or octaethylene glycol bis-chloroformiate, neopentyl-glycol bis-chloroformiate or cyclic alkylene-bis-chloroformiates such as cis- or trans-cyclohexylene-[1,4-bis-chloroformiate], 1,4-dimethyl-cyclohexylene-[1,4-bis-chloroformiate], 2,2,4,4-tetramethyl-cyclobutylene - [1,3 - bis - chloroformiate], phenylene-[1,4-bis-chloroformiate] or 1,4-dimethylphenyl-[bis-chloroformiate] may also be used.

The bisfunctional alkyl-bis-chloroformiates are prepared by known methods, for example according to Nippon Kagaku Zasski, 82,606 (1961); U.S. Pats. No. 2,629,731 and No. 3,096,359; J. Am. Chem. Soc. 74, 3215 (1952), 77, 3145 (1955) or Belgian Pat. No. 593,044.

The process of the invention is carried out by dissolving 2 mol-equivalents of the steroid component in a neutral inert solvent, for example ethers such as dioxane, tetrahydrofurane, or diglym; hydrocarbons such as benzene, toluene, or cyclohexane, methylene chloride; chloroform; or in a mixture of the above solvents. In order to eliminate hydrohalic acid that has formed, an additional amount of from 1 to 1,000 mol-equivalents of a tertiary base, such as pyridine, quinoline, triethylamine, or dimethylaniline, is added. It is, however, also possible to use inorganic bases, for example sodium bicarbonate or calcium carbonate, to eliminate the acid. Subsequently 1 or 2 mol-equivalents, preferably 1 mol-equivalent, of one of the above-specified alkyl-bis-chloroformiates is added dropwise, if desired in one of the above-specified solvents, at temperatures of from −40° C. to the boiling points of the solvents used, preferably from 0° C. to 25° C. The reaction mixture is then left to stand for 1 to 120 hours at temperatures of from −40° C. to the boiling point of the solvent, preferably from 0° C. to 25° C. The reaction mixture is then poured onto water to which sodium bicarbonate may be added, whereupon the reaction products, generally, precipitate in crystalline form, in many cases only after a considerable time. Reaction products which remain oily are obtained in a pure (oily or crystalline) form by shaking them with suitable extracting agents. The reaction products may be purified, if required, by recrystallization or by chromatography; in many cases, it is sufficient to digest them thouroughly in a solvent in which the reaction product concerned is not soluble, or is as sparingly soluble as possible, for example diethyl ether or cyclohexane or a mixture of both.

After the compounds II have been reacted with the bischloroformiates III, it is, of course, also possible to introduce one or more fluorine atoms, for example via the corresponding oxido compounds in the 6,9- and/or 16-position, if in the compounds of Formula II at least one of the radicals Y, Z or $R_3$ does not represent a fluorine atom. Double bonds may also, subsequently, be introduced in the usual manner, for example by oxidation with selenium dioxide or chloranil. Even a 11-oxo group may, subsequently, be reduced in the usual manner to yield a 11-hydroxy group.

The products of the invention have valuable pharmacological properties. In particular they have an anti-inflammatory activity and are superior to known compounds, for example to 21-desoxy-6-methyl-9-fluoro-prednisolone. The bis - [corticosteroid-21] - alkyl-carbonates, surprisingly, show a considerably higher anti-inflammatory activity than the monomeric 21-carbonates.

For example, the dimeric corticosteroid product diethylene - glycol - bis-[6α,9α-difluoro-16α-methyl-prednisolone]-21-carbonate (I) prepared according to Example 6 of the invention was compared with the monomeric steroid derivative 6α,9α-difluoro-16α-methyl-prednisolone-21 - diethyleneglycol - monomethyl-ether carbonate (II) which had been prepared as follows:

A solution of 90 mg. of diethyleneglycol-monomethyl-ether monochloroformiate in 1 ml. of absolute dioxane was added dropwise, while stirring, at 0° C. to a solution of 200 mg. of 6α,9α-difluoro-16α-methyl-prednisolone in 1.5 ml. of absolute dioxane and 1.5 ml. of absolute pyridine. After stirring had been continued for 16 hours at 20° C., the reaction mixture was poured onto water/sodium carbonate solution, whereupon crystals precipitated. After filtering, washing with water, drying and digesting with a small amount of ether, 152 mg. of 6α,9α-difluoro-16α-methyl - prednisolone - 21-diethylene-glycol-monomethyl-ether carbonate having a melting point of 144–146° C. were obtained.

The local inflammation-inhibiting properties of the reaction products were pharmacologically tested following the granuloma pouch test.

25 ml. of air were injected in the middle of the back skin of female Spague-Dawley rats having an initial body weight of from 150 to 200 g. and 0.5 ml. of a 1% croton oil was introduced into this air pouch. After 48 hours the air was removed under vacuum and after 72 hours the adhesion that had taken place was loosened.

For testing their local activity the substances were dissolved in 0.2 ml. of sesame oil and were directly injected once a day into the air pouch. On the eighth day after formation of this air pouch the animals were killed and the volume of the exudate that had collected in the pouch was measured. The amount of exudate taken from the tested group was gathered and compared with the amount obtained from the untreated control group. The inhibition of exudation is indicated in percentage.

RESULTS

| Number of animals per group | Amount of exudate in mg. at a dosage of— | | | Inhibition of exudation in percent at a dosage of— | | |
|---|---|---|---|---|---|---|
| | 0.5γ | 2.0γ | 10γ | 0.5γ | 2.0γ | 10γ |
| Control, 40 | | 6.6 | | | 0 | |
| I, 20 | 4.9 | 2.4 | 0.8 | 25.2 | 63.4 | 87.8 |
| II, 40 | 4.9 | 4.3 | 2.2 | 26.0 | 34.4 | 65.7 |

Graphical evaluation of the probability system shows that substance I is four times as effective as substance II. That is, dimerizing the corticoid-21-carbonates with a 21-alkyl-carbonate radical, for example in the above case, an activity is achieved in the granuloma pouch test which is at least four times higher than that of the corresponding monomeric comparison substance II.

Because of their good anti-inflammatory effect, the products of the invention may advantageously be used in veterinary and human therapy for treating inflammatory dermatoses of the most different geneses in the form of suspensions, ointments, creams or sprays, as well as, for example, for local treatment in the form of crystal suspensions, for example for intra-articular injections.

The following examples serve to illustrate the invention, but they are not intented to limit it thereto. Melting points were determined on a Kofler heating bench and are uncorrected.

EXAMPLE 1

A solution of 245 mg. of trans-cyclohexylene-[1,4-bis-chloroformiate] (=bis-chlorocarbonate of trans-quinital) in 2 ml. of absolute dioxane was added dropwise, while stirring, at 0° C. to a solution of 660 mg. of 11-desoxy-corticosterone in 4 ml. of absolute pyridine, whereupon a white precipitate separated. After stirring had been continued for 4 hours at 0° C., the reaction mixture was left to stand for 16 hours at 20° C. Then it was poured onto an aqueous solution of sodium bicarbonate and washed with little methanol, whereupon white crystals precipitated at once. These were filtered, washed carefully with water and dried over $P_2O_5$ in vacuo. After digesting the crystals in ether, 668 mg. of trans-quinital-bis-[11 - desoxy-corticosterone - 21]-carbonate having a melting point of 210–215° C. were obtained which after recrystallization from methylene chloride/ether showed a melting point of 228° C.

Typical infrared bands: at 1,740; 1,715; 1,660; 1,605; 1,250 cm.$^{-1}$; no more OH-bands were present.

EXAMPLE 2

In a same manner as disclosed in Example 1 the solution of 205 mg. 6α,9α-difluoro-16α-methyl-prednisolone in 1.5 ml. of absolute pyridine was reacted with a solution of 65 mg. of transcyclohexylene-[1,4-bis-chloroformiate] in 1 ml. of absolute dioxane and the product obtained was worked up. 184 mg. of trans-quinital-bis-[6α,9α-methyl-prednisolone-21]-carbonate were obtained (after digesting with ether) having a melting point of 198–204° C. After recrystallization from methylenechloride/benzene/ether the product showed a melting point of 208–210° C.

Typical infrared bands: 3,480; 1,730–1,745; 1,720; 1,660; 1,620; 1,255 cm.$^{-1}$.

EXAMPLE 3

A solution of 126 mg. of triethyleneglycol-bis-chloroformiate in 2.5 ml. of absolute dioxane was added dropwise while stirring at 0° C. to a solution of 360 mg. of 6α-methyl-9α-fluoro-prednisolone in 2 ml. of absolute pyridine, whereupon a precipitate separated. After stirring had been continued for 3½ hours at 0° C. the reaction mixture was left to stand for 18 hours at 23° C. Subsequently the mixture was poured on about 50 ml. of water containing sodium carbonate and then washed with a small amount of methanol. After some time a white crystallized precipitate separated. The precipitate was filtered, carefully washed with water, dried in vacuo over phosphorus pentoxide and digested with cold ether. 293 mg. of triethyleneglycol - bis[6α - methyl-9α-fluoro-prednisolone-21]-carbonate having a melting point of 153–154° C. were obtained. After recrystallization from a small amount of methylenechloride/ether-cyclohexane the product of the invention showed the melting point of 155–156° C.

Typical infrared bands: 3,430; 1,745; 1,720; 1,655; 1,605; 1,260; 1,120 cm.$^{-1}$.

EXAMPLE 4

In the same manner as disclosed in Example 3, a solution of 360 mg. 6α-methyl-9α-fluoro-prednisolone in 2 ml. of pyridine was reacted with a solution of 146 mg. of tetraethyleneglycol-bis-chloroformiate in 2.5 ml. of dioxane and the reaction product obtained was worked up. 326 mg. of tetraethyleneglycol-bis-[6α-methyl-9α-fluoro-prednisolone-21]-carbonate having a melting point of 235–240° C. were obtained (after previous sintering).

Typical infrared bands: 3,420–3,460; 1,745; 1,720; 1,650; 1,605; 1,260; 1,115 cm.$^{-1}$.

EXAMPLE 5

In the same manner as disclosed in Example 3, a solution of 300 mg. of 6α,9α-difluoro-16α-methyl-prednisolone in 2 ml. of absolute pyridine and 2 ml. of absolute dioxane was reacted with a solution of 117 mg. of tetraethyleneglycol-bis-chloroformiate in 1.5 ml. of absolute dioxane and the reaction product obtained was worked up. 285 mg. of tetraethyleneglycol-bis[6α,9α-difluoro-16α-methyl-prednisolone-21]-carbonate having a melting point of 268–270° C. were obtained.

Typical infrared bands: 3,400; 3,420; shoulder at 3,550; 1,750; 1,720; 1,660; 1,620; 1,260; 1,130–1,140 cm.$^{-1}$.

EXAMPLE 6

Diethyleneglycol-bis-[6α,9α-difluoro-16α-methyl-prednisolone-21]-carbonate

In the same manner as disclosed in Example 3, a solution of 288 mg. of 6α,9α-difluoro-16α-methyl-prednisolone in 2 ml. of absolute pyridine was reacted with a solution of 90 mg. of diethyleneglycol-bis-chloroformiate in 2 ml. of absolute dioxane and the reaction product was worked up. After the reaction mixture had been poured onto a mixture of water and sodium carbonate solution, the reaction product, which at first had precipitated in an oily form, slowly crystallized after having been left for several days (and triturated at the wall of the glass vessel). The crystals were filtered off, carefully washed with water, dried and digested with a small amount of cold ether. 272 mg. of diethyleneglycol - bis - [6α,9α-difluoro-16α-methyl-prednisolone-21]-carbonate having a melting point of 157–160° C. were obtained (after previous sintering). The infrared spectrum showed a location of the bands which was similar to the reaction products obtained in Examples 2–5.

EXAMPLE 7

A solution of 750 mg. of triethylene-glycol-bis-chloroformiate in 2 ml. of absolute dioxane was added dropwise while stirring at 0° C. to a solution of 1.8 g. of prednisolone in 10 ml. of absolute pyridine. After having been left for 16 hours at 20° C. the mixture was poured onto a mixture of water and sodium chloride solution, whereupon an oil precipitated. The aqueous phase was decanted, the oil was taken up with ether and the ether was evaporated to a large extent. The reaction product was obtained in crystalline form. After filtration, 1.34 g. of triethyleneglycol-bis-[prednisolone-21]-carbonate having a melting point of 139–140° C. were obtained.

Typical infrared bands: 3,440; 1,750; 1,725; 1,655; 1,610; 1,260; 1,110 cm.$^{-1}$.

EXAMPLE 8

In the same manner as disclosed in Example 7, 3.6 g. of prednisolone, dissolved in 20 ml. of pyridine, were reacted with a solution of 1.3 g. diethyleneglycol-bis-chloroformiate in 3 ml. absolute dioxane and the reaction product obtained was worked up. 2.74 g. of diethyleneglycol-bis-[prednisolone-21]-carbonate having a melting point of 160–165° C. were obtained (the melting point was not typical since it comprised too broad a range).

Typical infrared bands: 3,450; 1,745; 1,720; 1,650; 1,610; 1,260; 1,105 cm.$^{-1}$.

EXAMPLE 9

Trans-quinital-bis-[6α-methyl-prednisolone-21]-carbonate

In the same manner as disclosed in Example 1, a solution of 3.74 g. of 6α-methyl-prednisolone in 25 ml. of absolute pyridine was reacted with a solution of 1.3 g. of cyclohexylene-[1,4-bis-chloroformiate] in 11 ml. of absolute dioxane and the reaction product was worked up. 4.3 g. of crude trans-quinital-bis-[6α-methyl-prednisolone-21]-carbonate were obtained which after recrystallization from tetrahydrofurane/ether had a melting point of 263° C.

Typical infrared bands: 3,460–3,480; 1,745 (shoulder); 1,720; 1,650; 1,605; 1,255 cm.$^{-1}$.

EXAMPLE 10

Ethyleneglycol-bis-[6α-methyl-prednisolone-21]-carbonate

In the same manner as disclosed in Example 1, a solution of 374 mg. of 6α-methyl-prednisolone in 3 ml. of absolute pyridine was reacted with a solution of 103 mg. ethyleneglycol-bis-chloroformiate in 1 ml. of absolute dioxane and the reaction product was worked up. The reaction product, which precipitated first in an oily form, slowly crystallized after having been digested several times with distilled water. After isolation, 323 mg. of dried ethyleneglycol-bis-[6α - methyl - prednisolone-21]-carbonate were obtained which after digesting with ether had a melting point of 191–196° C.

Typical infrared bands: 3,430; 1,750; 1,720; 1,650; 1,605; 1,285; 1,230 cm.$^{-1}$.

EXAMPLE 11

Neopentylglycol-bis-[6α-methyl-prednisolone-21]-carbonate

In the same manner as disclosed in Examples 1 and 10, a solution of 374 mg. of 6α-methyl-prednisolone in 3 ml. of pyridine was reacted with a solution of 122 mg. neopentylglycol-bis-chloroformiate (boiling point 102° C. under a pressure of 3 mm. mercury) in 1 ml. of dioxane and the reaction product was worked up. After digesting the product with ether, 293 mg. of neopentylglycol-bis-[6α-methyl-prednisolone-21]-carbonate having a melting point of 270–274° C. were obtained.

Typical infrared bands: 3,440; 1,745; 1,720; 1,645; 1,605; 1,250 cm.$^{-1}$.

EXAMPLE 12 n-Hexane-1,6-diol-bis-[6α-methyl-prednisolone-21]-carbonate

In the same manner as disclosed in Examples 1 and 10, a solution of 374 mg. of 6α-methyl-prednisolone in 3 ml. of pyridine was reacted with 128 mg. of n-hexane- 1,6-diol-bis-chloroformiate dissolved in 1 ml. of dioxane and the reaction product obtained was worked up. After digesting the product with ether, 243 mg. of n-hexane-1,6-diol-bis-[6α-methyl-prednisolone-21]-carbonate having a melting point of 166–170° C. were obtained.

Typical infrared bands: 3,440; 1,740 (shoulder); 1,715; 1,645; 1,600; 1,255 cm.$^{-1}$.

EXAMPLE 13

Ethyleneglycol-bis-[9α-fluoro-16α-methyl-prednisolone-21]-carbonate

In the same manner as disclosed in Example 1, a solution of 196 mg. of dexamethasone in 3 ml. of pyridine was reacted with a solution of 55 mg. of ethyleneglycol-bis-chloroformiate in 1 ml. of dioxane and the reaction product was worked up. The reaction product, which precipitated in oily form, was isolated in the usual manner by extracting with chloroform, washing etc. and the oil obtained was crystallized by digesting with ether. After filtration, crystallized ethyleneglycol-bis-[6α-fluoro-16α-methyl-prednisolone-21]-carbonate having a melting point of 226° C. was obtained.

Typical infrared bands: 3,450; 1,750; 1,720; 1,655; 1,610; 1,285; 1,230 cm.$^{-1}$.

EXAMPLE 14

Ethyleneglycol-bis-[6α,9α-difluoro-16α-methyl-prednisolone-21]-carbonate

In the same manner as disclosed in Example 13, 205 mg. of 6α,9α-difluoro-16α-methyl-prednisolone were reacted within 48 hours and the reaction product was worked up. After the reaction product (which first precipitated in oily form) had been digested with ether, 156 mg. of ethyleneglycol-bis-[6α,9α-difluoro-16α - methyl - prednisolone-21]-carbonate having a melting point of 228–232° C. were obtained on filtration.

Typical infrared bands: 3,460; 1,750; 1,720; 1,660; 1,605–1,615; 1,285; 1,230 cm.$^{-1}$.

EXAMPLE 15

Trans-quinital-bis-[9α-fluoro-16α-methyl-prednisolone-21]-carbonate

In the same manner as disclosed in Example 2, 196 mg. of dexamethasone were reacted and the reaction product was worked up. After digesting the product with ether, 162 mg. of trans-quinital-bis-[9α-fluoro-16α-methyl-prednisolone-21]-carbonate having a melting point of 198–200° C. were obtained. After recrystallization from methylene chloride/tetrahydrofurane/ether, the melting point was 216–217° C.

Typical infrared bands: 3,420; 1,740 (shoulder); 1,715; 1,650; 1,600–1,610; 1,260 cm.$^{-1}$.

EXAMPLE 16

Trans-quinitol-bis-[6α-fluoro-prednisolone-21]-carbonate

In the same manner as disclosed in Example 1, a solution of 380 mg. of 6α-fluoro-prednisolone in 2.5 ml. of pyridine was reacted with a solution of 130 mg. of cyclohexylene-[1,4-bis-chloroformiate] in 1.5 ml. of dioxane and the reaction product obtained was worked up. 282 mg. of trans-quinitol-bis-[6α-fluoro-prednisolone-21]-carbonate having a melting point of 190° C. were obtained.

Typical infrared bands: 3,460; 1,745; 1,720; 1,655; 1,620; 1,260 cm.$^{-1}$.

EXAMPLE 17

Neopentylglycol-bis-[6α-fluoro-prednisolone-21]-carbonate

In the same manner as disclosed in Examples 1 and 10, a solution of 380 mg. of 6α-fluoro-prednisolone in 3 ml. of pyridine was reacted with a solution of 122 mg. of neopentylglycol-bis-chloroformiate and the reaction product was worked up. After digesting with ether, 244 mg. of neopentylglycol - bis - [6α-fluoro-prednisolone-21]-carbonate having a melting point of 186–190° C. were obtained.

Typical infrared bands: 3,460; 1,750; 1,720; 1,660; 1,620; 1,260 cm.$^{-1}$.

EXAMPLE 18

1.4-dimethyl-quinitol-bis-[6α,9α-difluoro-16α-methyl-prednisolone]-carbonate

In the same manner as disclosed in Example 2 or 1, 205 mg. of 6α,9α-difluoro-16α-methyl-prednisolone were reacted with 70 mg. of 1,4-dimethylcyclohexylene-[1,4-bis-chloroformiate] and the reaction product obtained was worked up. 173 mg. of crude 1,4-dimethyl-quinitol-bis-[6α,9α - difluoro-16α-methyl-prednisolone-21]-carbonate having a melting point of 190–198° C. were obtained. This was recrystallized from methylene chloride/ether.

Typical infrared bands: 3,450–3,480; 1,735–1,750 (shoulder); 1,720; 1,655; 1,615; 1,250–1,260 cm.$^{-1}$.

EXAMPLE 19

1,4-dimethyl-quinital-bis-[6α-methyl-prednisolone-21]-carbonate

In the same manner as disclosed in Example 18, 185 mg. of 6α-methyl-prednisolone were reacted. After an analogous work-up, 148 mg. of crystallized 1,4-dimethyl-quinite - bis-[6α-methyl-prednisolone-21]-carbonate were obtained having the typical infrared bands: 3,460–3,480; 1,740–1,745 (shoulder); 1,720; 1,655; 1,610; 1,255 cm.$^{-1}$.

EXAMPLE 20

Neopentylglycol-bis-[6α,9α-difluoro-16α-methyl-prednisolone-21]-carbonate

In the same manner as disclosed in Example 13, 205 mg. of 6α,9α-difluoro-16α-methyl-prednisolone were reacted with 70 mg. of neopentylglycol-bis-chloroformiate and the reaction product was worked up. After digesting with ether, 164 mg. of neopentylglycol-bis-[6α,9α-difluoro-16α-methyl-prednisolone-21]-carbonate having a melting point of 228–234° C. were obtained. After recrystallization from methylene chloride/ether, this showed the following typical infrared bands: 3,440–3,480; 1,745 (shoulder); 1,720; 1,655; 1,605–1,615; 1,255 cm.$^{-1}$.

EXAMPLE 21

Neopentylglycol-bis-[9α-fluoro-16α-methyl-prednisolone-21]-carbonate

In the same manner as disclosed in Example 20 or 13, 196 mg. of dexamethasone were reacted with 70 mg. of neopentylglycol-bis-chloroformiate and the reaction product was worked up. 174 mg. of neopentylglycol-bis-[9α-fluoro-16α-methyl-prednisolone-21]-carbonate having a melting point of 186–191° C. were obtained.

Typical infrared bands: 3,440; 1,745 (broad shoulder); 1,720; 1,655; 1,605–1,615; 1,260 cm.$^{-1}$.

We claim:
1. A bis-[steroid-21]-alkyl-carbonate of the formula

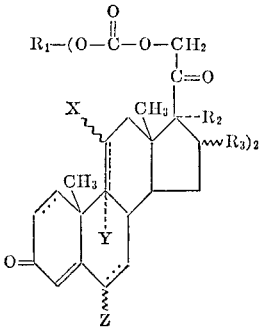

wherein X is hydrogen,

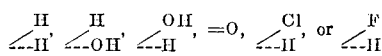

Y is hydrogen or fluorine; Z is hydrogen, fluorine, or methyl; $R_1$ is —$(CH_2)_{2-18}$—,

—[$(CH_2CH_2O)_{1-7}$—$CH_2CH_2$]— neopentylene, cyclohexylene, 1,4-dimethyl-cyclohexylene, 2,2,4,4-tetramethylcyclobutylene, phenylene, or 1,4-dimethyl-phenylene; $R_2$ is hydrogen or hydroxy; and $R_3$ is hydrogen, methyl in the α- or β-position, or fluorine; and corresponding compounds having an additional olefinic unsauration in the 1,2-, 6,7-, or 9,11-position.

2. The method of making a bis-[steroid-21]-alkyl-carbonate as defined in claim 1 which comprises reacting two equivalents of a corticosteroid of the formula

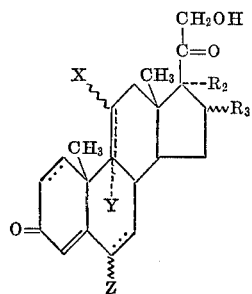

wherein X, Y, Z, $R_2$, and $R_3$ are defined as in claim 1, in an inert solvent in the presence of an acid scavenger and at a temperature from —40° C. to the boiling point of the solvent employed, with one equivalent of a bis-chloroformiate of the formula

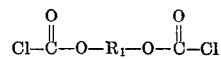

wherein $R_1$ is as defined in claim 1.

3. Trans - cyclohexylene - 1,4-bis[11-desoxycorticosterone-21]-arbonate.

4. Trans - cyclohexylene - 1,4-bis-[6α,9α-difluoro-16α-methyl-prednisolone-21]-carbonate.

5. Diethyleneglycol - bis - [6α,9α-difluoro-16α-methyl-prednisolone-21]-carbonate.

6. Diethyleneglycol-bis-[prednisolone-21]carbonate.

7. Trans-cyclohexylene-1,4-bis-[6α-methylprednisolone-21]-carbonate.

8. Trans - cyclohexylene-1,4-bis[9α-fluoro-16α-methyl-prednisolone-21]-carbonate.

9. Trans - cyclohexene-1,4-bis[6α-fluoro-prednisolone-21]-carbonate.

10. A pharmaceutical composition containing an effective amount of a bis-[steroid-21]-alkyl-carbonate as defined in claim 1 as the active ingredient thereof.

References Cited
UNITED STATES PATENTS

| | | | |
|---|---|---|---|
| 3,048,581 | 8/1962 | Fried | 260—239.55 |
| 3,488,421 | 1/1970 | Casadio | 424—243 |

ELBERT L. ROBERTS, Primary Examiner

U.S. Cl. X.R.

424—243